United States Patent
Zibuschka et al.

(10) Patent No.: US 11,250,155 B2
(45) Date of Patent: Feb. 15, 2022

(54) METHOD FOR MANAGING PERSONAL DATA IN A DISTRIBUTED SYSTEM

(71) Applicant: Robert Bosch GmbH, Stuttgart (DE)

(72) Inventors: Jan Zibuschka, Magstadt (DE); Ralph Retter, Stuttgart (DE); Stefan Schmid, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 261 days.

(21) Appl. No.: 16/330,809

(22) PCT Filed: Aug. 29, 2017

(86) PCT No.: PCT/EP2017/071607
§ 371 (c)(1),
(2) Date: Mar. 6, 2019

(87) PCT Pub. No.: WO2018/046343
PCT Pub. Date: Mar. 15, 2018

(65) Prior Publication Data
US 2019/0236307 A1     Aug. 1, 2019

(30) Foreign Application Priority Data

Sep. 8, 2016 (DE) .................. 102016217080.5

(51) Int. Cl.
*G06F 21/62* (2013.01)
*G06Q 50/26* (2012.01)
(Continued)

(52) U.S. Cl.
CPC ....... *G06F 21/6245* (2013.01); *G06Q 50/265* (2013.01); *H04L 63/08* (2013.01); *H04L 67/1097* (2013.01)

(58) Field of Classification Search
None
See application file for complete search history.

(56) References Cited

U.S. PATENT DOCUMENTS 7,966,647 B1 * 6/2011 Igoe ........................ G06Q 40/08
726/2
9,817,995 B2 * 11/2017 Papakipos ............... G06F 21/31
(Continued)

FOREIGN PATENT DOCUMENTS

DE        102009038035 A1     2/2011

OTHER PUBLICATIONS

Greenwald, et al.: "Oracle Essentials: Oracle Database 12c", 5th Ed., Publ. O'Reily Media Inc. (2013), pp. 1-405.
(Continued)

*Primary Examiner* — Esther B. Henderson
(74) *Attorney, Agent, or Firm* — Norton Rose Fulbright US LLP; Gerard Messina

(57) ABSTRACT

A method for managing personal data stored in a distributed system, in which the personal data are transmitted from a terminal device to at least one network node; and in which there is furnished to the user, by the distributed system, a user interface by way of which the personal data are to be managed in respective network nodes of the distributed system which manage the personal data; and in which management instructions furnished via the user interface, for managing the personal data within the distributed system, are transmitted via a predefined interface that is configured at least on the respective network nodes of the distributed system which manage the personal data.

13 Claims, 4 Drawing Sheets

(51) Int. Cl.
*H04L 29/06* (2006.01)
*H04L 29/08* (2006.01)

(56) References Cited

U.S. PATENT DOCUMENTS

| | | | | |
|---|---|---|---|---|
| 2014/0244399 | A1* | 8/2014 | Orduna | G06Q 30/0269 705/14.66 |
| 2015/0309754 | A1* | 10/2015 | Smithwick | H02J 7/00 711/166 |
| 2015/0356316 | A1* | 12/2015 | Thompson | G06F 21/6245 726/28 |
| 2016/0034713 | A1* | 2/2016 | Ramirez | H04L 63/0428 713/168 |
| 2018/0011938 | A1* | 1/2018 | Boccon-Gibod | G06F 16/9535 |
| 2018/0341784 | A1* | 11/2018 | Barday | G06F 21/6245 |

OTHER PUBLICATIONS

Tanenbaum and Van Steen: "Distributed Systems: Principles and Paradigms", 2nd Ed., Pearson Prentice Hall, (2006). XP055503558.
Wikipedia: "Vernetztes Auto—Networked Automobile", Internet Article, version of Jul. 30, 2016, pp. 1-12.
International Search Report for PCT/EP2017/071607, dated Oct. 13, 2017.
Dieter Masak, "Moderne Enterprise Architekturen", 2005, Springer, XP055406660. ToC, Ch04, Ch07-Ch11, Ch15, Glossar, Lit, Ind, Chapters 4, 7 and 9.
Hans Hermann Schild et al., "Loschen im SAP-System", Ai B extra, Apr. 1, 2015, XP055412805. Retrieved from the Internet: URL:http://mip.de/wp-content/uploads/mip-GmbH-AGM_AiB-ArtikeLpdf, pp. 47 and 49-50.
Anonymous, "35 BDSG", Dejure.Org, 2009, XP055412795. Retrieved from the Internet: URL:https://dejure.org/gesetze/BDSG/35.html.

* cited by examiner

METHOD FOR MANAGING PERSONAL DATA IN A DISTRIBUTED SYSTEM

FIELD

The present invention relates to a method for management by a user of personal data stored in a distributed system, and to a network configured to carry out the method that is presented.

BACKGROUND INFORMATION

E-data, such as those collected e.g., by smartphones, are transferred from them to servers and managed there. In order to manage the personal data him- or herself, i.e., for instance to delete them, a user about whom the personal data were collected must, in a laborious process, make contact with an owner of the server and have them deleted.

If the personal data have already been transferred to several servers or network nodes that, for example, are associated with different owners, the user must make contact with each owner and give separate deletion instructions. It is accordingly almost impossible for the user to maintain control over his or her personal data.

German Patent Application No. DE 10 2009 038 035 A1 describes a method for configuring infotainment applications in a motor vehicle by way of a configuration interface.

SUMMARY

Example embodiments of the present invention are described herein.

An example method in accordance with the present invention that is presented herein serves in particular for the management of personal data that have been collected by a network or are stored in a network. Provision is made for that purpose that a user interface, by way of which the personal data are to be managed in respective network nodes of the network, i.e., a distributed system, which manage the personal data, is furnished to the user of the network. "Personal data" in this context are data that are uniquely associated with a specific person, in particular a natural person but also a juridical person, or can be at least indirectly associated therewith with acceptable effort. "Personal data" are indications regarding personal or practical relationships of a specific or specifiable person, in particular of a natural person.

The user interface that is provided can be configured in particular as a so-called "dashboard" that furnishes to a user, via a graphical surface, a capability for creating control instructions that are suitable for managing his or her personal data in a network. The user interface provided for carrying out the example method that is presented herein can of course also be configured as a non-graphical interface that is to be operated by direct input of control instructions. The user interface that is provided for carrying out the method that is presented can be implemented or furnished by a network node, for example a terminal device connected to a server.

In order to distribute respective control instructions for managing the user's personal data, furnished by a user by way of the user interface that is provided, in a network in such a way that the user's personal data are managed, i.e., for instance deleted, identically in the entire network, i.e., in all network nodes of the network, provision is made that the control instructions furnished by the user by way of the user interface are exchanged between respective network nodes of the network via an interface specially provided for the transfer of such control instructions.

In order to manage respective personal data by way of the user interface, it is necessary in particular for the user interface for managing the personal data to encompass at least rules for ascertaining information as to which personal data have been or are being managed by which user or which network node. Based on that information, a user can make a decision as to how he or she wishes to manage his or her personal data, and can generate corresponding control instructions by way of the user interface.

Provision is made that at least on respective network nodes of a network which manage personal data, an interface is set up which is suitable for transferring control instructions furnished by way of the user interface. The interface of a respective network node can be invoked or activated by a further network node in order to request personal data, i.e., data that are associated with a user or with a user pseudonym, or to transfer them to the respective network node. The interface furnishes, in particular, functions for deleting and correcting or modifying personal data, and correspondingly enables control of personal data by the user or by a management system managing at least one user.

The interface for transferring the control instructions for managing personal data which are furnished by way of the user interface can already exist on a respective network node or can be downloaded from other network nodes. It is possible in particular for respective control instructions for managing personal data to be passed on from one network node to another by way of the interface.

One possible sequence in which control instructions for managing personal data are passed on could be configured as outlined below:

1) By way of a user interface, control instructions or functions are furnished for management, e.g., for deletion (delete(user, data_desc, Cert) and for modification (correct(user, data_desc, new_data, Cert), of personal data by a user. The variables indicated in parentheses refer to the following: "user"=a user identifier and/or an authentication feature of the user; "data_desc"=an index, a query, or another descriptor, for example an attribute, which describes data that are to be deleted or modified; "new_data"=new values for modifying the data; "Cert"=a certificate or other document which proves that the user "user" wishes to either delete or modify the data "data_desc". In the case of modification, the certificate or document encompasses corresponding new values.
2) When a network node receives a deletion instruction, the network node checks whether "data_desc" is applicable to personal data "PII" stored on the network node.
3) Optionally, the network node checks, for each datum "PII" affected by the deletion instruction, whether that datum can be deleted, and either deletes all data "PII" that can be deleted or inhibits those data "PII" which cannot be deleted, for example by creating an access control function.
4) The network node checks whether the deletion instruction is applicable to further network nodes connected to the network node.
5) If the deletion instruction is applicable to further network nodes connected to the network node, the network node processes the deletion instruction in such a way that it contains, for example, instead of a user pseudonym for the network node "$user_1$", a user pseudonym "$user_k$" for the network node "k" connected to the network node. Provision can furthermore be made, if applicable, that the deletion instruction is adapted for a transport protocol between the network nodes, for example by the fact that it is compressed and/or encoded. Alternatively, an adapted interface "correct$_n$" can also be added to the deletion instruction.
6) The network interface forwards the deletion instruction to respective network nodes connected to the network node, on which nodes the process described above begins again.

When a network node receives a modification instruction, the network node carries out the following process:
1) The network node checks whether "data_desc", i.e., an index, a query, or another descriptor, for example an attribute, which describes data to be deleted or to be modified on the network node, is applicable to personal data "PII" stored there.
2) Optionally, the network node checks, for each datum "PII" affected by the modification instruction, whether there is documentation by way of a control instruction "Cert", i.e., a certificate or other documentation which proves that the user "user" who wishes to either delete or modify the data "data_desc" is authorized, that the datum "PII" must be corrected, and carries out a modification of corresponding data "PII" only if the documentation exists.
3) The network node modifies the datum "PII" so that it now contains a value from a new data set "new_data".
4) The network node checks whether the modification instruction is applicable to further network nodes, for example including network nodes that are not directly connected to the network node.
5) The network node processes the modification instruction in such a way that it now contains, instead of a user pseudonym "user$_1$" for the network node "1", a pseudonym "user$_k$" for a network node "k". The network node furthermore adapts the modification instruction for transport to a respective further network node, by the fact that the modification instruction is compressed and/or encoded and/or encompasses an adapted interface.
6) The network node forwards the modification instruction to further relevant network nodes, on which the process described above begins again.

Because respective management instructions furnished by a user by way of the user interface are passed on, personal data stored in distributed fashion in a network can be managed centrally by the user.

In order to identify respective network nodes that are managing or have managed personal data of a user, a management instruction furnished by a user can be transferred to respective network nodes that are presently and/or were previously connected to the first network node in accordance with at least one transmission protocol of a first network node.

In particular in the context of a network having various network nodes that use different operating systems, provision can be made that the interface that is provided is used in order to adapt control instructions, furnished by the user, to the respective operating system, and to enable management, i.e. for example deletion or modification, of personal data stored on the various network nodes.

For the transfer of management instructions via the interface that is provided, provision can be made that respective network nodes managing the personal data encompass storage device for storing data and communication device for transmitting data to a further network node, respective personal data being exchanged between the storage device and the communication device via a program structure that is used in order to manage management rules, furnished by way of the user interface, for the personal data.

Thanks to a splitting of the storage device and communication device, forwarding of data by the communication device can be monitored by the fact that a program structure is interposed between the storage device and the communication device. A program structure of this kind can log all accesses or management steps for data stored on the storage device, and disclose them correspondingly transparently for a user or a management system. In addition, a program structure of this kind can be controlled directly by a user or by a management system, using management instructions, via the user interface that is provided and, for example, can implement forwarding rules, predefined by the user or by the management system, for the user's personal data. Provision is made for that purpose in particular that respective personal data ascertained by a terminal device of the user are transferred exclusively to the storage device.

In order to prevent the management of personal data by unauthorized users, provision is made that in order to manage the personal data via the user interface, the user is authenticated by way of a terminal device identifier and/or an information query and/or by way of a contact with security personnel.

It is possible for a manufacturer which manages, by way of the method that is presented, a network of components that are supplied, for example, by a supplier, to act as a user, so that the manufacturer can implement its own routines and data protection lines in the network.

The present invention furthermore relates to a network having a plurality of network nodes, respective network nodes of the plurality of network nodes being configured to manage and exchange among one another personal data acquired by a terminal device; at least one network node of the network being configured to furnish a user interface by way of which at least one management instruction for managing the personal data is to be transmitted to the network nodes; and respective network nodes of the network being configured to exchange the at least one management instruction for managing the personal data via an interface configured specifically for transferring the at least one management instruction.

The example network in accordance with the present invention that is presented herein serves in particular to carry out the example method that is presented.

Provision is made in particular that at least one network node of the network that is presented is a control device or a control unit of a vehicle or of a further terminal device to be used by a user.

The network that is presented is suitable, in combination with the method that is presented, for centrally managing and correspondingly controlling, by way of a user interface that is embodied, for example, on a respective terminal device, personal data that are collected by respective terminal devices that are being used by a user. Provision is made for that purpose in particular that management instructions furnished by the user for managing his or her personal data are automatically distributed over the entire network.

Further advantages and embodiments of the present invention are evident from the description herein and from the figures.

It is understood that the features described above and those yet to be explained below are usable not only in the respective combination indicated but also in other combinations or in isolation, without departing from the scope of the present invention.

DETAILED DESCRIPTION OF EXAMPLE EMBODIMENTS

Figure 1:
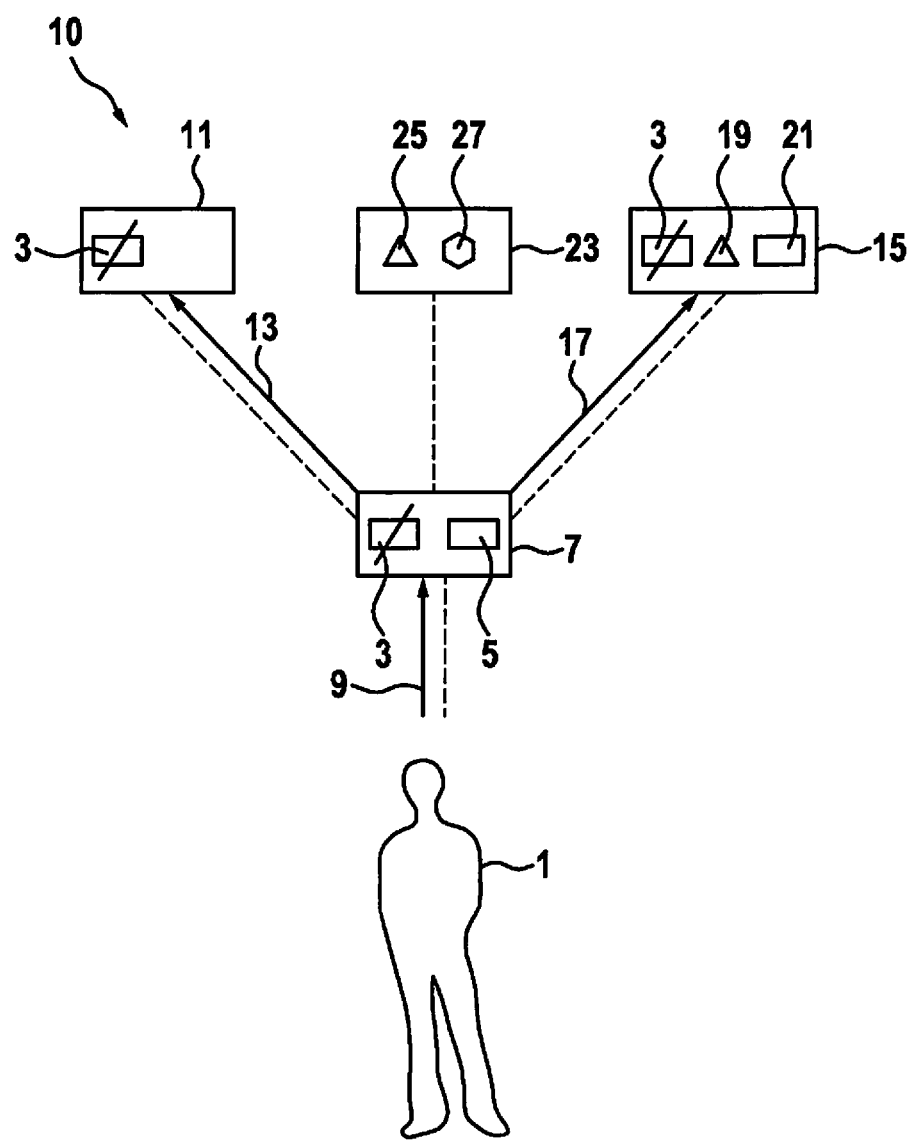
FIG. 1 schematically depicts a possible embodiment of the method that is presented.

FIG. 1 depicts a user 1 who is transmitting, via a user interface, a deletion instruction for personal data 3 to a network node 7 that contains personal data 3 and data 5, as indicated respectively by an arrow 9 and a crossed-out symbol for personal data 3.

In order to delete personal data 3 in an entire network 10, network node 7 transfers the deletion instruction for personal data 3 to a network node 11 as indicated by arrow 13, and to a network node 15 as indicated by arrow 17. Personal data 3 are correspondingly deleted on network nodes 15 and 11, as indicated by the crossed-out symbols for personal data 3.

Data packets 19 and 21 that are present on network node 15 are not deleted, however, since they are not covered by deletion criteria predefined by user 1.

A network node 23 is connected to network node 7 but does not have any personal data 3 stored on it, so that a deletion instruction is also not transferred to network node 23. Data packets 25 and 27 stored on network node 23 are correspondingly also not deleted.

The deletion instruction for deleting personal data 3 can be configured, for example, in such a way that it encompasses an instruction to delete all the data that contain the word "user" or that were stored during a predefined time period by user 1. It is of course also conceivable to delete personal data 3 in location-specific fashion, so that all personal data that were acquired at a location "A" or that are associated with location "A" are deleted.

Figure 2:
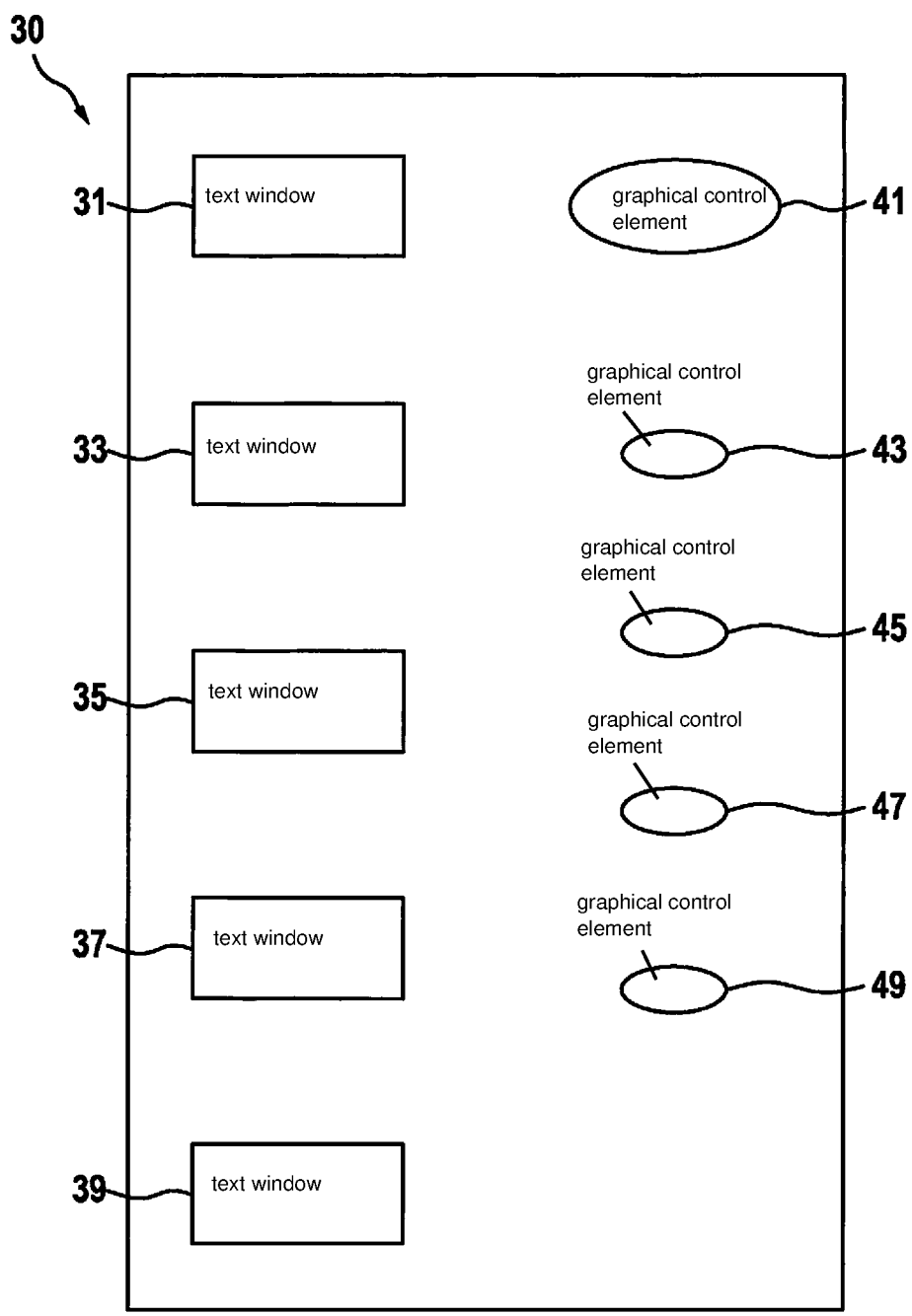
FIG. 2 shows a possible embodiment of a user interface provided for carrying out the method that is presented.

FIG. 2 depicts a user interface 30 that presents to a user, through text windows 31, 33, 35, 37, and 39, respective personal data such as a log of services requested by the user from his or her smartphone. Corresponding log entries associated with text windows 31 to 39 can be managed, i.e. for example deleted, by the user by way of graphical control elements 41 to 49. To do so the user selects, e.g. via control element 41, a respective management instruction, for example a deletion instruction. User interface 30 transfers the deletion instruction to a first network node that deletes corresponding data from the log and forwards the deletion instruction to network nodes connected to the network node.

Figure 3:
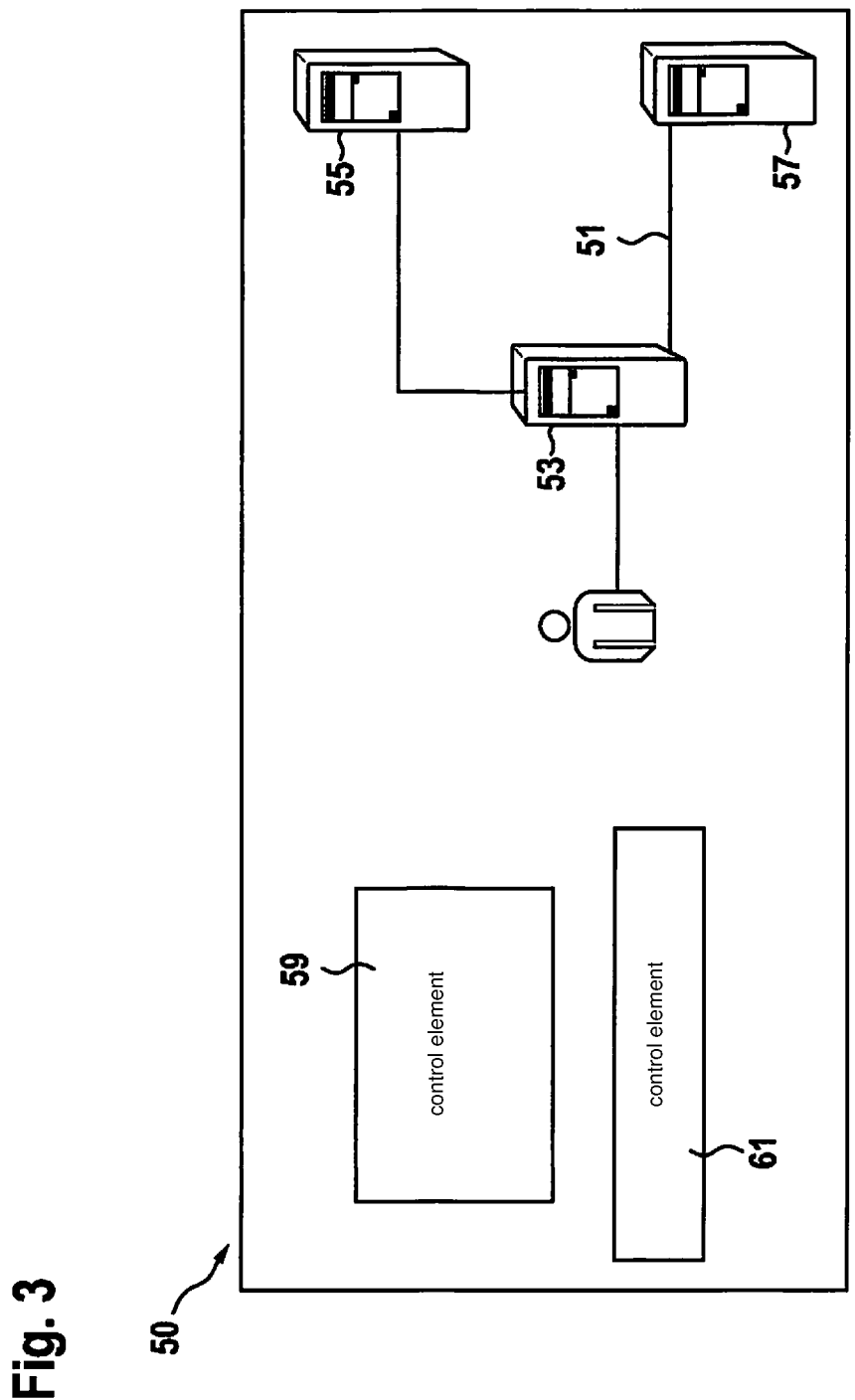
FIG. 3 shows a further possible embodiment of a user interface for carrying out the method that is presented.

FIG. 3 depicts a further user interface 50. The user interface furnishes to the user a graphical overview of a network 51 in which the user's personal data are exchanged. In the present case, user-related data collected by a terminal device 53 are forwarded to a network node 55 of a first company and to a network node 57 of a second company. By way of a control element 59, the user can directly access a management point for the management of his or her personal data by the first company, and via a control element 61 can directly access a management point for management of his or her personal data by the second company, so that, for example, forwarding of the personal data from terminal 53 to network node 55 of the first company can be interrupted by way of corresponding settings at the management point of the first company.

Figure 4:
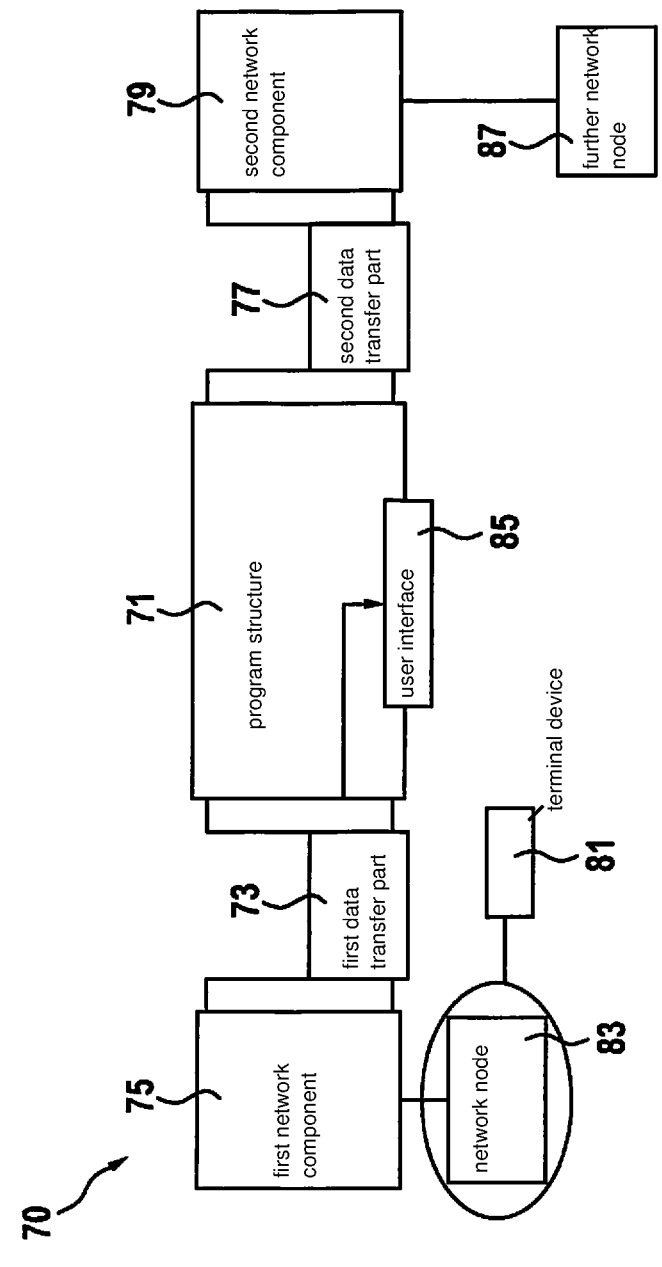
FIG. 4 shows a management logic of an interface provided for carrying out a possible embodiment of the method that is presented.

FIG. 4 depicts a management logic of an interface 70. Interface 70 encompasses a program structure 71 that is connected via a first data transfer part 73 to a first network component 75, for example a memory, and via a second data transfer part 77 to a second network component 79, for example a communication element.

From a terminal device 81, personal data are transmitted to a network node 83 that, on the basis of the personal data, ascertains a user model and stores it in first network component 75.

Program structure 71 furthermore furnishes a user interface 85 by way of which a user of program structure 71 can predefine management instructions according to which respective data, to be transferred by way of interface 70 from first network component 75 to second network component 79 and via the latter to a further network node 87, are to be managed, i.e. for example filtered as a function of respective user stipulations.

What is claimed is:

1. A method for managing personal data stored in a distributed system, the method comprising:
   providing to a user, by a first network node of the distributed system, a first user interface;
   receiving, by the first network node and via the first user interface, a user instruction to delete the personal data stored in a storage device of the first network node; and
   responsive to the user instruction, the first network node:
      deleting the personal data from the storage device of the first network node;
      determining that the user instruction is applicable to a second network node; and
      based on the determination that the user instruction is applicable to the second network node, transmitting an instruction to the second network node to delete the personal data stored in a storage device of the second network node, wherein the second network node is configured to provide a second user interface via which the user is able to directly input the user instruction to delete the personal data from the second network node and wherein the first and second network nodes are user controllable to store the personal data in the respective storage device of either of the first and second network nodes without the personal data being stored in the other of the first and second network nodes.

2. The method as recited in claim 1, wherein the instruction to the second network node is generated by the first network node by converting the received user instruction into the instruction for the second network node.

3. The method as recited in claim 1, wherein the response to the user instruction is implemented via a program structure that is used in order to manage management rules of the personal data with which the personal data is exchanged between the storage device of the first network node and a communication device of the first network node.

4. The method as recited in claim 3, wherein the program structure is used to manage rights and logs of the personal data.

5. The method as recited in claim 1, wherein the personal data are exchanged in encoded fashion between the first and second network nodes.

6. The method as recited in claim 1, wherein, for management of the personal data, the user is authenticated via the user interface of the first network node by way of at least one of:
- a terminal device identifier;
- an information query; and
- a contact with security personnel.

7. The method as recited in claim 1, wherein to manage the personal data, the user interface of the first network node encompasses at least rules for ascertaining information as to which personal data have been managed by which user or by which network node.

8. The method as recited in claim 1, wherein the transmission to the second network node is performed in accordance with at least one transmission protocol of the second network node.

9. A network comprising:
- a communication system; and
- a first network node, wherein the first network node is configured to:
  - provide to a user a first user interface;
  - receive, via the first user interface, a user instruction to delete personal data stored in a storage device of the first network node; and
  - responsive to the user instruction, the first network node:
    - delete the personal data from the storage device of the first network node;
    - determine that the user instruction is applicable to a second network node; and
    - based on the determination that the user instruction is applicable to the second network node, transmit, via the communication system, an instruction to the second network node to delete the personal data stored in a storage device of the second network node, wherein the second network node is configured to provide a second user interface via which the user is able to directly input the user instruction to delete the personal data from the second network node and wherein the first and second network nodes are user controllable to store the personal data in the respective storage device of either of the first and second network nodes without the personal data being stored in the other of the first and second network nodes.

10. The network as recited in claim 9, wherein at least one of the first and second network nodes is a control device of a vehicle.

11. The network as recited in claim 9, wherein the instruction to the second network node is generated by the first network node by converting the received instruction into the instruction for the second network node.

12. The method as recited in claim 1, wherein the second network node is configured to respond to the instruction from the first network node by deleting the personal data from the storage device of the second network node, determining that the instruction from the first network node is applicable to a third network node, and based on the determination that the instruction from the first network node is applicable to the third network node, transmit an instruction to the third network node to delete the personal data stored in a storage device of the third network node.

13. The method as recited in claim 1, wherein the second user interface is usable by the user to interrupt the second network node from performing the deletion instructed by the first network node.

* * * * *